US010452683B2

(12) United States Patent
Sadhwani (10) Patent No.: US 10,452,683 B2
(45) Date of Patent: Oct. 22, 2019

(54) SELECTIVELY SYNCHRONIZING DATA ON COMPUTING DEVICES BASED ON SELECTIVE SYNC TEMPLATES

(71) Applicant: ADOBE INC., San Jose, CA (US)

(72) Inventor: Dhiraj Sadhwani, Bangalore (IN)

(73) Assignee: Adobe Inc., San Jose, CA (US)

( * ) Notice: Subject to any disclaimer, the term of this patent is extended or adjusted under 35 U.S.C. 154(b) by 346 days.

(21) Appl. No.: 15/441,812

(22) Filed: Feb. 24, 2017

(65) Prior Publication Data
US 2018/0246946 A1 Aug. 30, 2018

(51) Int. Cl.
*G06F 16/27* (2019.01)
*G06F 16/23* (2019.01)

(52) U.S. Cl.
CPC ........ *G06F 16/273* (2019.01); *G06F 16/2358* (2019.01); *G06F 16/27* (2019.01)

(58) Field of Classification Search
CPC ...... G06F 16/178; G06F 16/273; G06F 16/27; G06F 16/275; G06F 16/182; G06F 16/122; G06F 16/16; G06F 16/901; G06F 21/6218; G06F 16/10; G06F 16/113; G06F 16/119
USPC ........... 707/600–831, 899, 999.001–999.206
See application file for complete search history.

(56) References Cited

U.S. PATENT DOCUMENTS

| | | | | |
|---|---|---|---|---|
| 2007/0198746 A1* | 8/2007 | Myllyla | ................. | G06F 16/40 709/248 |
| 2009/0138808 A1* | 5/2009 | Moromisato | .......... | G06Q 10/10 715/758 |
| 2012/0110515 A1* | 5/2012 | Abramoff | ............. | G06F 16/904 715/854 |
| 2013/0019276 A1* | 1/2013 | Biazetti | ................... | H04L 65/40 726/1 |
| 2013/0191339 A1* | 7/2013 | Haden | ................... | H04L 65/403 707/638 |
| 2016/0255139 A1* | 9/2016 | Rathod | ............... | G06F 16/9535 709/203 |
| 2016/0323217 A1* | 11/2016 | Subramani | ............. | H04L 51/08 |

* cited by examiner

*Primary Examiner* — Angelica Ruiz
(74) *Attorney, Agent, or Firm* — Brake Hughes Bellermann LLP (57) ABSTRACT

Systems and techniques that provide selective synchronization using selective sync templates. Selective sync templates specify criteria for identifying subsets of the user's content files to synchronize on any computing device on which they are used. The selective sync templates are stored on a server and accessible for use by any computing device authorized to access a user's account to access the user's content files. The selective sync templates are also themselves synchronized so that changes to a template on one computing device are synchronized to the template on the server and the user's other computing devices. In one exemplary embodiment, a computing devices receives a selective sync template from a server and input to use the template to selectively synchronize content files. The computing device then synchronizes the content files according to that template until a new or different template is selected for use on the computing device.

19 Claims, 7 Drawing Sheets

SELECTIVELY SYNCHRONIZING DATA ON COMPUTING DEVICES BASED ON SELECTIVE SYNC TEMPLATES

TECHNICAL FIELD

This disclosure relates generally to computer-implemented techniques and more particularly relates to improving the efficiency and effectiveness of computing systems used to synchronize files on multiple computing devices.

BACKGROUND

Network storage services allow users to store their content files on network servers and access the content files from other computer devices through a computer network. Copies of the content files are typically stored locally on the user's computing devices and synchronized with the content files on a server. In one example, a user sets up synchronization for a folder so that sub-folders and content files in the folder are stored on, and synchronized across, multiple devices (e.g., on her desktop at work, on her tablet at home, on her mobile phone, and on a server maintained by the network storage service).

Users are able to customize the synchronization on a particular device to only synchronize particular sub-folders and files. Doing so can be useful to avoid unnecessarily tying up storage on a computing device for content files that are not used on the computing device. For example, where a user account includes a sub-folder with work-related content files and a sub-folder with personal content files, the user may configure the synchronization on the desktop she uses at work to only include the sub-folder of work-related content files. The synchronization selections of specific sub-folders and files are specific to the particular computing device. To use the same synchronization selections on another computing device, the selections must be recreated and re-implemented on the other computing device. Moreover, when a computing device is lost, broken, or replaced, the synchronization selections on that device are lost. The user must then repeat the process of determining which data to synchronize on the replacement device and make the synchronization selections again.

SUMMARY

Systems and methods disclosed herein provide selective synchronization ("sync") using selective sync templates. Selective sync templates specify criteria for identifying subsets of the user's content files to synchronize on any computing device on which they are used. The selective sync templates are stored on a server and accessible for use by any computing device authorized to access a user's account to access the user's content files. The selective sync templates are also themselves synchronized so that changes to a template on one computing device are synchronized to the templates on the server and the user's other computing devices.

In one exemplary embodiment, a computing device receives a selective sync template from a server and uses the template to selectively synchronize content files. The selective sync template is associated with the user account and provided by the server to the computing device based on the computing device being authorized to access the user account. The computing device receives input to use the selective sync template for synchronization between the server and the computing device. Based on this input, the computing device uses the template to synchronize content files between the computing device and the server. The computing device identifies the subset of the content files to synchronize between the server and the computing device by identifying which of the user's content files have characteristics specified by the criteria of the selective sync template. The computing device stores a copy of the subset of the content files locally on the computing device. The subset on the server and copy of subset on the computing device are synchronized with one another. When a change to the subset on the server is detected, a corresponding change is made to the copy of the subset on the computing device. Similarly, when a change to the copy of the subset on the computing device is detected, a corresponding change is made to the subset on the server.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Techniques for selective synchronization ("sync") using selective sync templates are disclosed. Selective sync templates specify criteria for identifying subsets of a user's content files to synchronize on any computing device on which the templates are used. Thus, for example, a user can create a selective sync template and use it on both the user's desktop and the user's tablet. The same subset of the user's content files will be synchronized on both the desktop and the tablet based on the selective sync template. A user is able to create multiple selective sync templates that are made available across all of the user's computing devices. When one of the selective sync templates is used on a particular computing device, the subset of the content files to synchronize on that device is identified based on the criteria of the selective sync template. The criteria of the selective sync template specify characteristics that content files must have and/or not have to be included in the subset. For example, the criteria of a selective sync template may include in the subset only content files with specified characteristics, such as content files that have specific file names, that are within specific folders, that have file sizes that are larger or smaller than a threshold size, or that have some combination of these characteristics. While all of the user's content files are stored on a server and associated with the user's account, only the subset of the content files identified using the selective sync template is stored on the computing device and synchronized with the server. When a change to the subset of the content files on the server is detected, the change is synchronized to the copy on the computing device. Similarly, when a change to the copy of the subset of the content files on the computing device is detected, the change is synchronized to the server.

The selective sync templates associated with a user's account are made available for use on multiple devices by storing the templates on a server with the user's content files. From the server, the selective sync templates can be accessed by any of the user's computing devices. The server allows any computing device that is authorized to access the user's account to access the content files to also retrieve and use any of the user's selective sync templates. In one example, a synchronization client application ("app") on a computing device downloads all of the user's selective sync templates from the server and provides a user interface that allows the user to select to use one of the selective sync templates for synchronization on the computing device.

In one embodiment, the selective sync templates that are stored on the server are synchronized on the computing devices associated with the user account. This ensures that the available and current selection sync templates are on each of the devices for use upon selection. After a template is created on one computing device, it is synchronized onto the server and, from there, onto the other computing devices. Synchronizing the templates also ensures that the criteria of a selective sync template are consistent across multiple devices. In an example, a selective sync template is used on both a first computing device and a second computing device. The user uses an interface of a client synchronization application on the first computing device to change the criteria of the template from only synchronizing content files of less than 1 GB to only synchronizing content files of less than 2 GB. This edit changes the local copy of the selective sync template on the first computing device. This change is detected and the corresponding selective sync template on the server is synchronized to also have the change. This change on the server is then detected and the local copy of the selective sync template on the second computing device is synchronized with the change. In this way, the selective sync template remains synchronized on all of the computing devices.

In one embodiment, the selective sync templates associated with a user's account are additionally, or alternatively, made available for use on multiple devices by using a data format that can be used on different types of devices, operating systems, and client applications. In one embodiment, a selective sync template is text-based and uses a key-value format to specify the characteristics that content files must have and/or not have to be included in the subset. In the key-value format, the key identifies a content file attribute and the value identifies the value that the attribute must have. For example, a selective sync template can include the text "file size greater than: 2 mb" to provide the key "file size greater than" and the corresponding value "2 mb." The text-based format of such a selective sync template can be used on different types of devices, operating systems, and client application to select the same subset of content.

In one embodiment, selection sync templates are separated from the content files associated with a user account. In one example, the selective sync templates are stored in their own namespaces, for example, as individually identifiable files. Storing the selection sync templates separately from the content files protects the content files from corruption and errors that might otherwise occur if selective synchronization were to be implemented by modifying the content files themselves.

Techniques disclosed herein provide numerous advantages over device-specific selective synchronization techniques. The techniques disclosed herein enable a user to specify criteria for selective synchronization and easily reuse those criteria on other computing devices so that the same subset of content files is synchronized on those devices. The reuse of templates encourages uniformity. For example, the user can use the same "work" template to synchronize work-related content files on multiple work devices. Because the same template is used, the subset of content that is synchronized on all the devices that use the template is ensured to be the same. The techniques also eliminate the need to recreate user-specified criteria for selective synchronization when a computing device is lost, stolen, or damaged. The templates are maintained on a server separate from the devices so that even if one or all of the user's devices are lost, stolen, or damaged, the template is still available for use on future devices. A user is also able to easily configure a new device by simply selecting a pre-existing selective sync template and has the flexibility to easily switch a device to use a different template that uses different criteria for selective synchronization on the device. For example, the user can temporarily select to switch from a selective sync template that synchronizes only work-related content files to a selective sync template that synchronizes personal photos to use those photos on a work desktop during a work break.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "server" refers to one or more computing devices that make electronic content available to other computing devices via a network. In one example, a server is a single computing device. In another example, a server includes multiple computing devices that are part of a server system or service. For example, the phrase "server" may refer to cloud-based storage that includes multiple computing devices at one or more locations that are used to provide a cloud-storage service.

As used herein, the phrase "file" refers to a computer resource for recording data discretely in a computer storage device. Files can be transmitted via a computer network from one computing device to another computing device. A content file is a file that includes content such as text, pictures, spreadsheets, flowcharts, images, etc.

As used herein, the phase "metadata" refers to data about other data. Metadata can be stored as part of or separately from the files with which it is associated. A selective sync template can be stored as metadata of content files or other files associated with a user account. Metadata can be associated with its own namespace so that the metadata can be accessed and retrieved independently of the files with which it is associated. For example, a selective sync template can be stored as a file associated with a user account and associated with its own namespace to separate the template from the content files identified by its criteria.

As used herein, the phrase "user account" refers to an account used by an individual, group of individuals, entity, or group of entities. For example, a user may create a user account with a network storage service to use to store content files for access on one or more of the user's computing devices. On a computing device, the user accesses the network storage service and provides credentials (e.g., name, password, etc.) to allow the computing device to access the user account, including the content files of the user account.

As used herein, the phrase "synchronizing" refers to maintaining similarity between electronic content and one or more copies of the electronic content. For example, synchronizing content files on a server with copies of the content files on another computing device involves detecting changes on the server and/or computing device and making corresponding changes to ensure that the content files on the server and the copies on the computing device are the same.

As used herein, the phrase "selective sync template" refers to a file, metadata, or other electronic content that can be transferred amongst computing devices and that specifies criteria for identifying a subset of content files. For example, a selective sync template may specify a maximum file size of 2 mb for content files that will be in the subset. When the selective sync template is used on a computing device, the subset of content files synchronized based on the template is limited to only the content files that are up to 2 mb in size. In another example, a user creates multiple selective sync templates using her devices and then selects particular selective sync templates for synchronizing data on the individual computing devices.

As used herein, the phrase "file synchronization system" refers to computing components used to synchronize a content files on multiple computing devices. For example, a file synchronization system can include a server that stores content files associated with one or more other computing devices with client synchronization apps that access, copy, edit, and/or synchronize copies of the content files on the computing devices.

Exemplary Computing Environment

Figure 1:
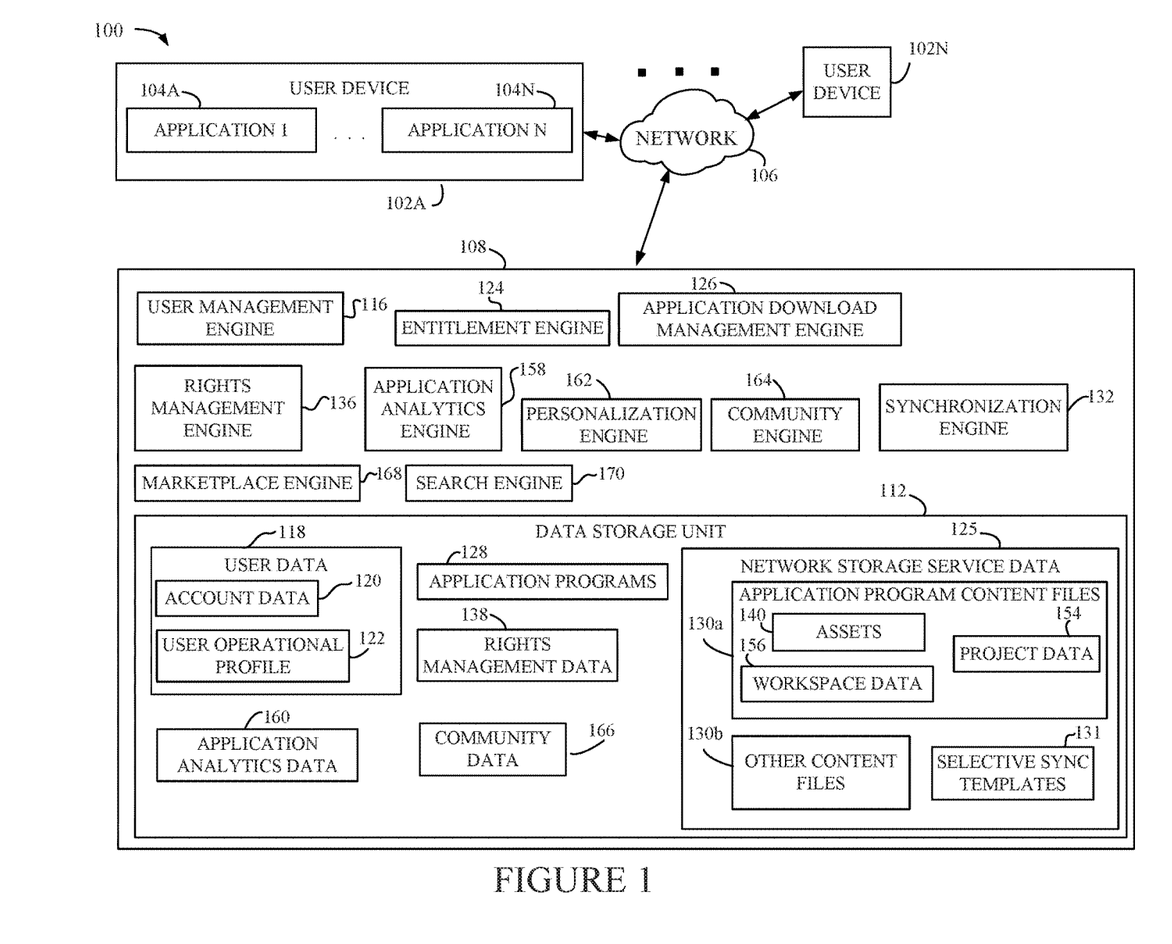
FIG. 1 is a diagram of an environment in which one or more embodiments of the present disclosure can be practiced.

FIG. 1 is a diagram of an environment 100 in which one or more embodiments of the present disclosure can be practiced. The environment 100 includes one or more user devices, such as a user device 102A up to a user device 102N. Each of the user devices is connected to a creative apparatus 108 via a network 106. A user of the user devices uses various products, applications, or services supported by the creative apparatus 108 via the network 106. The user devices correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manage digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108.

Digital experience, as described herein, includes experience that can be consumed through an electronic device. Examples of a digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, text, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer (PC), tablet computer, a desktop computer, a processing unit, any combination of these devices, or any other suitable device having one or more processors. Each user device includes at least one application supported by the creative apparatus 108.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates a user account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user management engine 116 and the entitlement engine 124 can be one single engine performing the functionalities of both the engines.

The user installs various applications supported by the creative apparatus 108 via an application download management engine 126. For example, a user may install a client synchronization app on user device 102A to control the synchronization of copies of content files 120 with the creative apparatus 108. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on the user's operational profile 122 are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages process of providing updates to the user device 102A.

Upon download, installation and launching of an application program, in one embodiment, the user is asked to provide login details to access the user's account. A check is again made by the user management engine 116 and the entitlement engine 124 to ensure that the user is entitled to use the application program. In another embodiment, direct access is provided to the application program as the user is already logged into the application manager. A user device's access to content files 120 stored on the creative apparatus 108 is similarly based on the device being authorized to access the user account associated with the content files 120.

The creative apparatus 108 includes network storage service data 125. This data is associated with user accounts and accessible by user devices that are authorized to access the user accounts. The network storage service data 125 includes content files 130 that include application program content files 130a and/or other content files 130b. The application program content files 130a are content files that are associated with electronic content created and edited using the various engines provided by the creative apparatus 108. The other content files 120 include content files from other sources separate from the creative apparatus 108. The network storage service data 125 can provide cloud storage for each of multiple people working on a project together. Each user account is associated with some of the content files 130. The content files associated with a user account are available on any device authorized to access the user account. In one example, two users each create user accounts and create content files that are associated with their respective accounts. Their content files 130 are stored in the network storage service data 125 and accessible to the users on their other computing devices.

The synchronization engine 132 and/or client synchronization apps on the user devices 102A-N enable the users to manage the synchronization of their content files 122 on their computing devices. For example, one of the users may create ten files that are stored in the network storage service data 125. The user may then synchronize five of those files, which are organized within a project folder, on a laptop and the other five files, which are organized within a photos folder, on a tablet using the selective synchronization techniques disclosed herein. The users may also share some or all of the content files 130 with one another. For example, the first user may share the project folder and the five files within it with the second user. Sharing the folder and files allows the second user to access, view, copy, and/or edit the folder and its content files.

The application program content files 130a are created by a user using one or more application programs 128 to create one or more projects or assets. In addition, the user also has a workspace within each application program. The workspace, as described herein, includes settings of the application program, settings of tools or settings of the user interface provided by the application program, and any other settings or properties specific to the application program. Each user has a workspace. The workspace, the projects or the assets are then stored as application program content files 130a in the data storage unit 112 by a synchronization engine 132. The application program content files 130a can be specific to the user or can be shared with other users based on rights management. The rights management is performed by a rights management engine 136. Rights management rules or criteria are stored as rights management data 138 in the data storage unit 112.

The application program content files 130a include one or more assets 140. The assets 140 can be a shared asset which the user wants to share with other users or which the user wants to offer on a marketplace. The assets 140 can also be shared across multiple application programs 128. Each asset can include metadata. Examples of the metadata include, but are not limited to, font, color, size, shape, coordinate, a combination of any of these, and the like. In addition, in one embodiment, each asset also includes a file. Examples of the file include, but are not limited to, an image, text, a video, a font, a document, a combination of any of these, and the like.

The application program content files 130a also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in another embodiment.

The user can have one or more user devices. The content files 130 are accessible by the user from any device, i.e. including the device which was not used to create the content files. This is achieved by the synchronization engine 132 that stores the content files 130 in the data storage unit 112 and makes the content files 130 available for access by the user or other users via any device. Before accessing the content files 130 by the user from any other device or by any other user, the user or the other user may need to provide login details for authentication if not already logged in. The workspace data 156 enables the synchronization engine 132 to provide same workspace configuration to the user on any other device or to the other user based on the rights management data 138.

The network storage service data 125 further includes selective sync templates 131 that are associated with user accounts. For example, the first user's account may have 2 selective sync templates associated with it. In this example, one template has criteria that identify the project folder, including the subset of content files in the project folder and another template has criteria that identify the photos folder, including the subset of content files within the photos folder. The selective sync templates 131 are stored as files or metadata in separate namespaces that are available for download and use on any computing device that is authorized to access the user account. The selective sync templates 131 can themselves be synchronized on the server and one or more computing devices associated with the account using techniques disclosed herein, as described with reference to FIG. 3 herein.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article recommendation can also be made by the synchronization engine 132 to incorporate some of other assets saved by the user and relevant for the article. Such recommendation can be generated using one or more engines as described herein.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the content files 130. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request an expert opinion or expert editing from another user. An expert user can then either edit the image as per the user liking or can provide the expert opinion. The editing and providing of the expert opinion by the expert is enabled using the community engine 164 and the synchronization engine 132. In collaborative workflows, each of a plurality of users is assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program content files 130. The search engine 170 can perform a search for an asset using the metadata or the file.

It is to be appreciated that the engines and working of the engines are described as examples herein and the engines can be used for performing any step in providing digital experience to the user.

Figure 2:
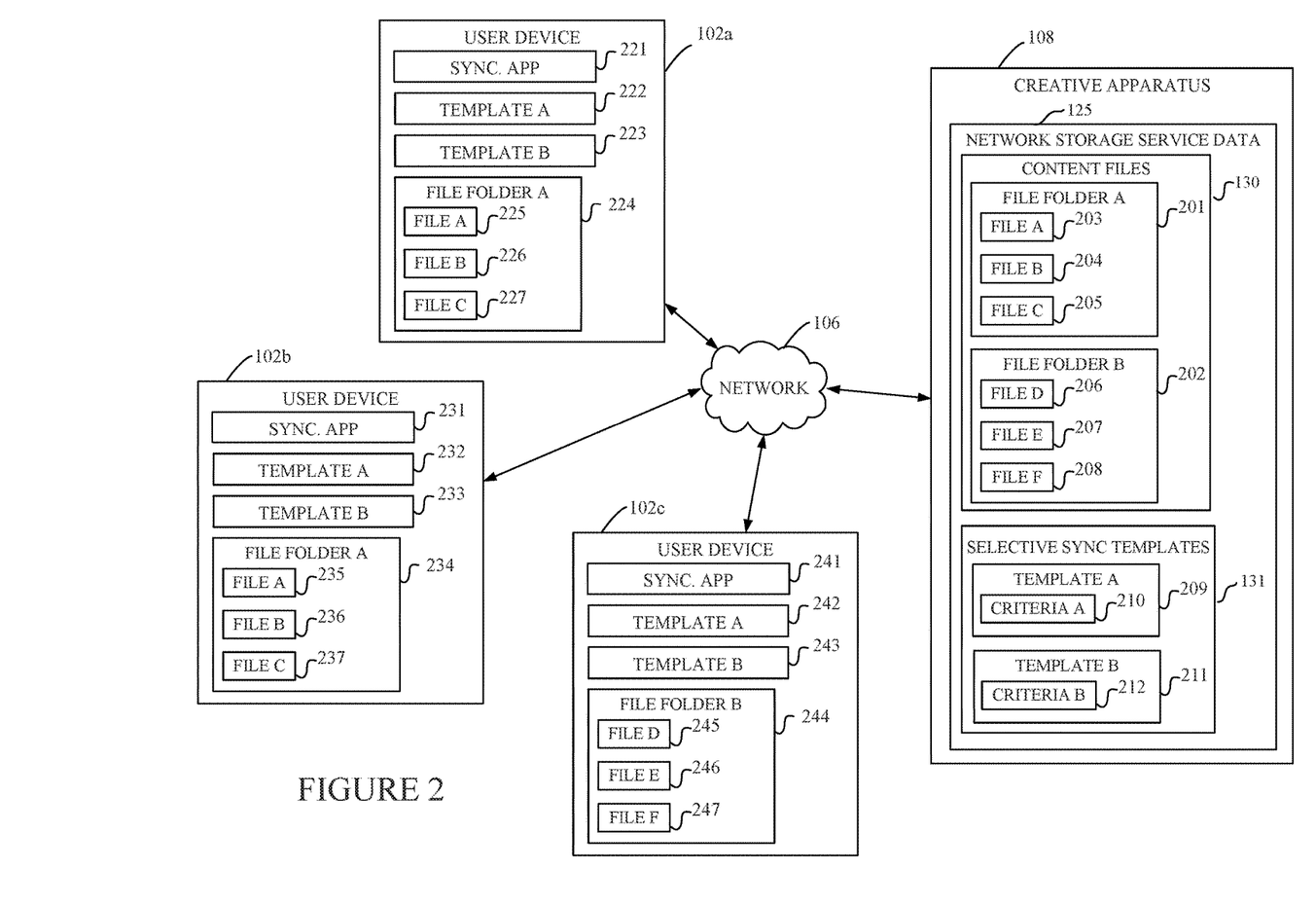
FIG. 2 illustrates exemplary components of the environment of FIG. 1 for selectively synchronization using selective sync templates.

FIG. 2 illustrates exemplary components of the environment of FIG. 1 for selectively synchronization using selective sync templates. In FIG. 2, the creative apparatus 108 selectively synchronizes content files 130 in the network storage service data 125 with three user devices 102*a-c*. In this example, the content files 130 include a file folder A 201 that includes file A 203, file B 204, and file C 205 and file folder B 202 that includes file D 206, file E 207, and file F 208. The network storage service data 125 also includes selective sync templates 131 that include template A 209, which specifies criteria A 210, and template B, which specifies criteria B 212.

In the example of FIG. 2, each of the user devices 102*a-c* includes a client synchronization app 221, 231, 241, respectively. The client synchronization apps 221, 231, 241 include instructions stored in computer readable medium that when executed or otherwise used by the user devices performs various synchronization functions on the respective user devices. In this example, the client synchronization apps 221, 231, 241 synchronize the content files 130 and the selective sync templates 131 with corresponding copies on the respective user devices. Accordingly, user device 102*a* includes templates 222, 223 that are copies of templates 209, 210, user device 102*b* includes templates 232, 233 that are copies of templates 209, 210, and user device 102*c* includes templates 242, 243 that are copies of templates 209, 210. Template A is synchronized to be the same on the creative apparatus 108 (e.g., the server) and the user devices 102*a-c*. Thus, if template A 222 is changed on user device 102*a*, the change is detected and the change is made to the corresponding template A 209, 232, 242 on the other devices.

In the example of FIG. 2, template A 222 is selected for use on the user device 102a. As a result, the criteria 210 of template A are used to selectively synchronize file folder A 224 (including file A 225, file B 226, and file C 227) on the user device 102a. The file folder A 224 is synchronized with the corresponding file folder A 201. The content files to synchronize are identified based on the criteria 210 of the template A. In this example, the criteria 210 identify that any files within file folder A are to be synchronized.

The template A 232 is selected for use on the user device 102b. As a result, the criteria 210 of template A are used to selectively synchronize file folder A 234 (including file A 235, file B 236 and file C 237) on the user device 102b. The file folder A 234 is synchronized with the corresponding file folder A 201. Moreover, since template A 232 is the same as template A 222, the same subset of the content files 130 are synchronized on both user device 102a and user device 102b.

The template B 242 is selected for use on the user device 102c. As a result, the criteria 212 of template B are used to selectively synchronize file folder B 244 (including file D 245, file E 246 and file F 247) on the user device 102c. The file folder B 244 is synchronized with the corresponding file folder B 202. The content files to synchronize are identified based on the criteria 212 of the template B. In this example, the criteria 212 identify that any files within file folder A are to be synchronized.

In the example of FIG. 2, multiple selective sync templates 131 are associated with a user's account and used on three of the user's user devices. Two of the user devices 102a, 102b use the same selective sync template A, 222, 232, and thus synchronize the same subset of the content files 130. The other user device 102c uses a different selective sync template B 243 and thus synchronizes a different subset of data. However, because the selective sync templates 209, 211 are available for use on any of the user devices 102a-c, the user can quickly and easy switch the synchronization of content on any of the respective devices. Moreover, if one of the user devices 102a-c is lost, stolen, or damaged, the selective sync templates 131 are available for immediate use on a replacement user device without requiring that the user recreate the criteria.

Exemplary Techniques

Figure 3:
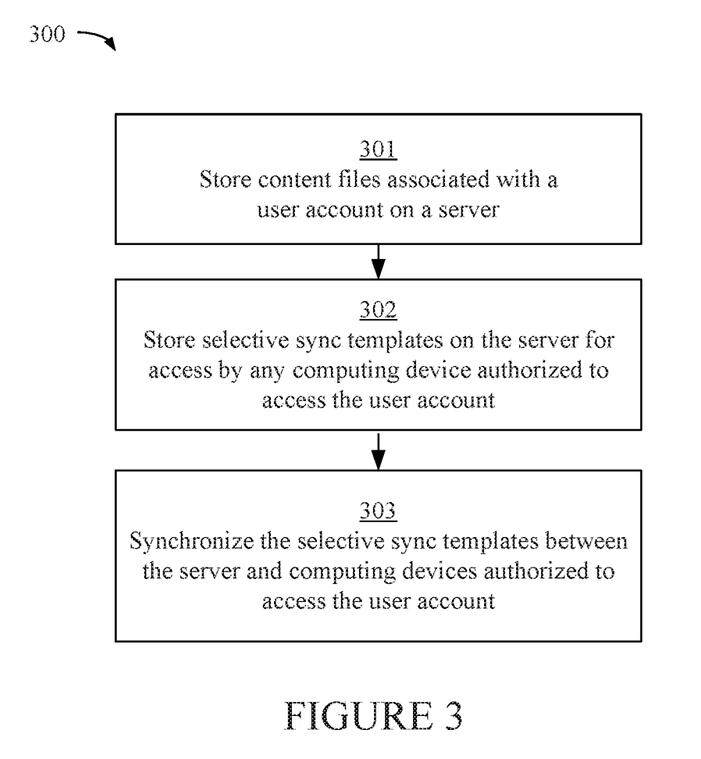
FIG. 3 is a flow chart illustrating an exemplary technique for storing and synchronizing selective sync templates for a user account.

FIG. 3 illustrates is a flow chart illustrating an exemplary technique 300 for storing and synchronizing selective sync templates for a user account. The exemplary technique 300 can be implemented by user device 102a and/or creative apparatus 108, although other devices and configurations can also be implemented. The exemplary technique 300 can be implemented by storing and executing instructions in a non-transitory computer-readable medium. Reference to the technique 300 being performed by a computing device includes the technique 300 being performed by one or more computing devices.

Technique 300 involves storing content files associated with a user account on a server, as shown in block 301. In one example, a user uses a content creation application on the server to create the content files and the content files are automatically stored on the server. In another example, the user uploads one or more content files for storage on the server in association with the user account. For example, a client synchronization app on the user's local device can present an interface that allows the user to drag and drop a folder of local content files to an icon representing storage on the server. In response, copies of the local folder and content files within it are uploaded to the server. In another example, one user shares content files with a second user and the shared files are associated the user account of the second user, allowing the second user to access, used, edit, and/or delete the content files.

Technique 300 further involves storing selective sync templates on the server for access by any computing device authorized to access the user account, as shown in block 302. In one embodiment, the selective sync templates associated with a user's account are made available for use on multiple devices by using a data format that can be used on different types of devices, operating systems, and client applications. In one embodiment, a selective sync template uses human-readable text to describe the criteria. Examples of human-readable text format include, but are not limited to, JavaScript Object Notation (JSON) and eXtensible Markup Language (XML). In one example, the format of the selective sync template uses key-value pairs to specify the characteristics that content files must have and/or not have to be included in the subset. The key identifies a content file attribute and the value identifies the value that the attribute must have or must not have. For example, a selective sync template can include the following text:

"fileSizeLessThan":"2mb"
"withinFolder": "work"

In another example, a selective sync template has an XML format that uses tags to specify the criteria. For example, a selective sync template can include the following text:

```
<include>
    <withinFolder>work</withinFolder>
</include>
<exclude>
    <fileSizeGreaterThan>2mb</fileSizeGreaterThan>
</exclude>
```

The text-based format of such a selective sync template can be used on different types of devices, operating systems, and client application to select the same subset of content.

Storing the selection sync templates separately from the content files in their own namespaces also provides advantages in certain embodiments. Templates associated with their own namespaces can be accessed, monitored, and revised, without the potential that such actions will corrupt or interfere with the content files. Templates stored on the server and corresponding copies of the templates stored on the computing devices can be associated with unique identifiers. For example, a template A and all copies of template A may include a unique identifier such as "001" that uniquely distinguishes the template from all other templates. A unique identifier for a template can be included in the template data. For example, a template may include a key/value pair such as "ID":"001" that identifies the unique identifier. Similarly, a XML tag-based template can include a tag such as <id>001</001> that identifies the unique identifier. A copy can be matched to a corresponding template on the server by matching the unique identifiers.

Technique 300 further involves synchronizing the selective sync templates between the server and computing devices authorized to access the user account, as shown in block 302. To synchronize the templates, the templates are monitored at their various locations to detect changes. For example, when a user changes the criteria of a template on one of the user's computing device's the change can be detected by monitoring the file or metadata containing the template for changes. In another example, a user interface that is provided on the user's computing device for the user to create and edit the templates editing features is configured to identify when a change is made to a template or a new template is created. For example, a save button on the user interface may be configured to trigger a template synchronization procedure that ensures that any changed or new templates are synchronized with the server and other computing devices.

Figure 4:
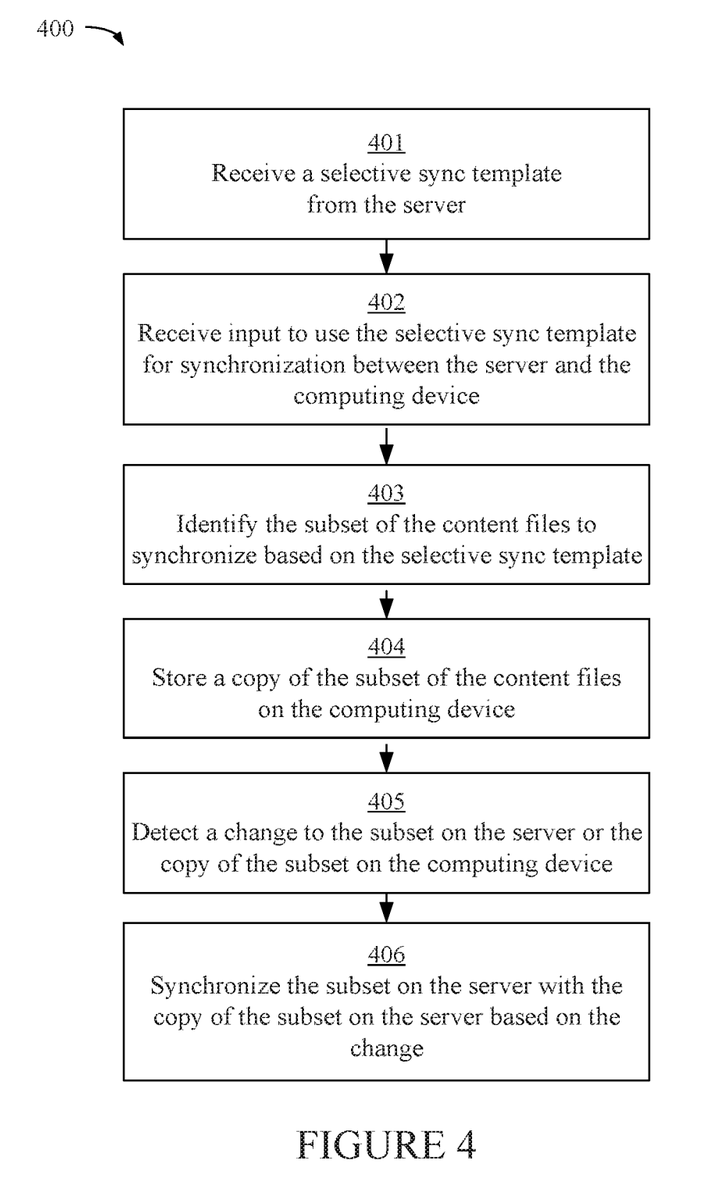
FIG. 4 is a flow chart illustrating an exemplary technique for selectively synchronizing the content files between the server and a computing device.

FIG. 4 illustrates is a flow chart illustrating an exemplary technique for selectively synchronizing the content files between the server and a computing device. The exemplary technique 400 can be implemented by user device 102A and/or creative apparatus 108, although other devices and configurations can also be implemented. The exemplary technique 400 can be implemented by storing and executing instructions in a non-transitory computer-readable medium. Reference to the technique 400 being performed by a computing device includes the technique 400 being performed by one or more computing devices.

The technique 400 involves receiving a selective sync template from the server, as shown in block 401. In one example, a user logs into a user account on a device and all of the selective sync templates associated with the account are downloaded to the computing device automatically following the login. In another example, one or more selective sync templates are downloaded from the server based on a user action on the computing device. For example, a template may be downloaded based on a user opening a user interface to create, edit, and/or apply a selective sync template on the computing device.

The technique 400 involves receiving input to use the selective sync template for synchronization between the server and the computing device, as shown in block 402. For example, a user interface that allows the user to create, edit, and/or apply a selective sync template may receive input identifying the selective sync template and input selecting a command to apply the selective sync template. In another example, a computing device receives multiple selective sync templates associated with the user account and the input to use a selective sync template selects one of the selective sync template from the multiple selective sync templates.

The technique 400 involves identifying a subset of the content files to synchronize based on the selective sync template, as shown in block 403. When the selective sync template is used on a particular computing device, the subset of the content files to synchronize on that device is identified based on the criteria of the selective sync template. The criteria of the selective sync template specify characteristics that content files must have and/or not have to be included in the subset. Identifying which of the content files have the characteristics specified by the criteria of the selective sync template can involve identifying which of the content files have a containing folder, file size, file creation date, and/or file type that satisfies the criteria of the selective sync template. For example, the criteria of a selective sync template may include in the subset only content files with specified characteristics, such as content files that have specific file names, that are within specific folders, that have file sizes that are larger or smaller than a threshold size, or that have some combination of these characteristics.

The technique 400 stores a copy of the subset of the content files on the computing device, as shown in block 404. Copies of some or all of the content files of the subset may already be stored on the computing device. If so, the computing device only downloads of copies of the content files of the subset that are not already on the computing device.

The technique 400 detects a change to the subset on the server or the copy of the subset on the computing device, as shown in block 405. The content files of subset and copy of the subset are monitored at their various locations to detect changes. For example, when a user opens a document, revises the text of the document, and saves a new version of the document on a computing device, the change can be detected by monitoring the file or metadata of the file for changes. In another example, a user interface that is provided on the user's computing device for the user to create and edit a content file is configured to identify when a change is made to a content file or a when a new content file is created. For example, a save button on the user interface may be configured to trigger a content file synchronization procedure that ensures that any changed or new content files are synchronized with the server. The server can include detectors that detect communications with changed and new content files are received and/or can detect changes to the stored content files are made in the storage on the server. In one example, a computing device or server periodically (e.g., every 10 minutes, every hour, etc.) analyzes stored content files to determine whether an edit data associated with any of the content files is within a recent amount of time (e.g., within the last 10 minutes, within the last hour, etc.)

Based on detecting a change, the technique 400 synchronizes the subset on the server with the copy of the subset on the computing device, as shown in block 406. If the change was detected on the computing device, a corresponding change is made on the server. If the change was detected on the server, a corresponding change is made on the computing device.

The selective sync template used on the computing device in technique 400 can also be used on a second computing device and any number of additional computing devices that are authorized to access the user account. When used on a second computing device, the selective sync template is used to identify the same subset of the content files for synchronization between the server and the second computing device.

Once a selective sync template is in use on one or more computing devices, the subset of content files identified by the selective sync template is synchronized between those one or more computing devices and the server. In addition, when the selective sync template is changed, the subset identified using the subset on all of the computing devices is also changed. For example, if the subset is changed so that more of the content files on the server are included in the subset, the additional content files are downloaded, stored on, and synchronized on the computing devices that use the selective sync template.

On a given computing device, a user can easily change which content files are synchronized on the device by simply changing which selective sync template is used on the device. If the user provides input to use a second selective sync template instead of the currently-used selective sync template for synchronization between the server and the computing device, a second subset of content file is identified for synchronization. Copies of content files in the original subset that are not in the second subset can be deleted and copies of content files in the second subset that are not in the original subset can be downloaded, stored, and synchronized on the computing device. In an alternative use case, a user selects to use a second selective sync template in addition to the currently-used selective sync template. In this case, any content files in either the first subset or the second subset or both are synchronized on the computing device. For example, a user may use a first template to synchronize work-related files on his work desktop computer and during a lunch break add a subset of photos specified by the criteria of a second selective sync template. After the lunch break, the user can deactivate the second selective sync template to conclude synchronization of the photos and/or remove copies of the photos from the work desktop.

Figure 5:
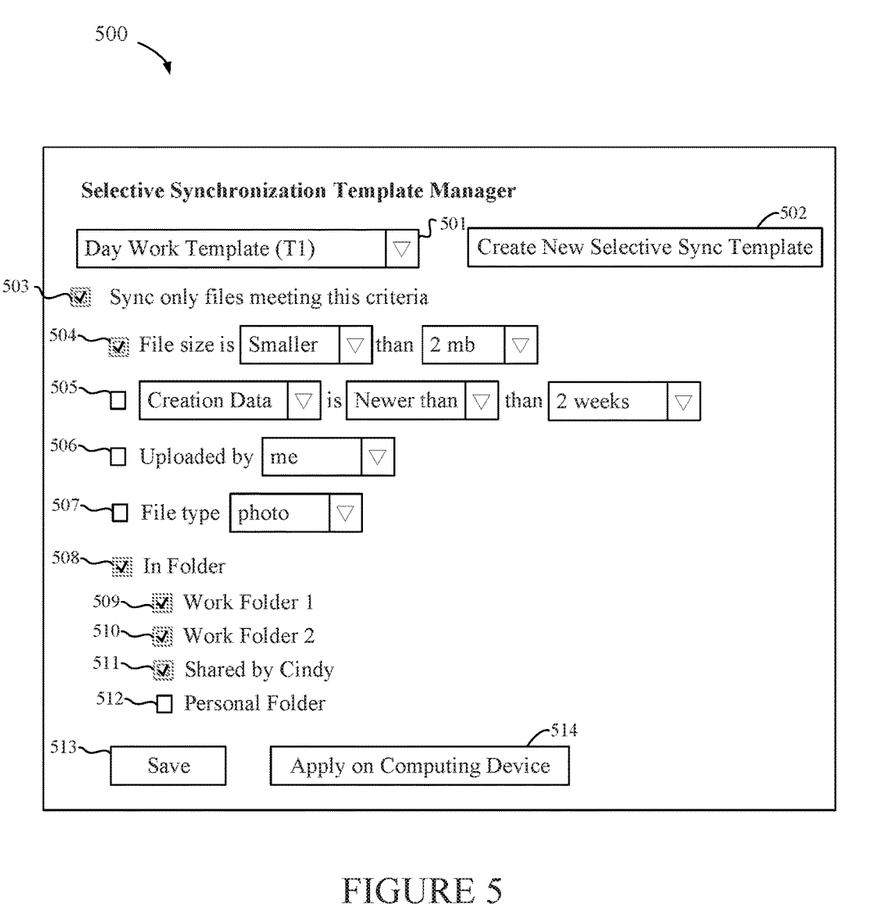
FIG. 5 is a block diagram illustrating an exemplary user interface for creating, editing, and applying a selective sync template on a computing device.

FIG. 5 is a block diagram illustrating an exemplary user interface 500 for creating, editing, and applying a selective sync template on a computing device. The user interface 500 is titled "Selective Synchronization Template Manager" and presents various controls that allow a user to create, edit, save, and apply selective sync templates. Control 501 allows the user to select an existing selective sync template. In this example, the user has selected template "Day Work Template (T1)." Control 502 allows the user to create a new template. Upon selecting control 502, the user is prompted to provide a name for the new template and specify criteria for the new template.

The user interface 500 includes an option 503 that allows the user to sync only files meeting the criteria. If option 503 is selected, then only content files meeting the criteria of the template will be synchronized on the computing device. If not, then content files identified by other selective sync templates will also be synchronized on the computing device.

Options 504-512 allow the user to specify criteria for the template. Option 504, if selected, requires that a content file have a file size smaller than (or larger than) a specified file size, e.g., 2 mb in this example, to be included in the subset of content files that is synchronized. Option 505, if selected, requires that a content file have a creation date (or last edit date) that is newer than (or older than) a specified time period, e.g., two weeks in this example, to be included in the subset of content files that is synchronized. Option 506, if selected, requires that a content file be uploaded by a specified person (e.g., "me") to be included in the subset of content files that is synchronized. Option 507, if selected, requires that a content file have a specified file type, e.g., photo, to be included in the subset of content files that is synchronized. Option 508, if selected, requires that a content file be in a selected folder to be included in the subset of content files that is synchronized. Options 509, 510, 511, 512 allow the user to select one or more folder for option 508. In the example of FIG. 5, the user has selected option 503, 504, and 508 and identified options 509, 510, 511 to select particular folders. The result is that only content files having a file size smaller than 2 mb and that are in one of Work Folder 1 (option 509), Work Folder 2 (option 510), or the Shared by Cindy Folder (option 511) will be included in the subset of files that are synchronized when the Day Work Template (T1) is used on a computing device. Command 513 saves the template including the criteria specified by options 503-512. Command 514 applies the template on the computing device.

The following use case illustrates a person using a template such as the Day Work Template (T1) of FIG. 5. In this example, a user, Laura is a webpage designer who works for Company Z that creates immersive designs for websites. Laura has an artist colleague, Cindy, who creates the image designs that Lara uses in the webpages. Cindy uses Adobe® Photoshop® photo editing software to create the designs and Laura makes use of Adobe® Dreamweaver® software to incorporate the designs into interactive webpages. Laura and Cindy collaborate using a shared folder associated with Cindy's user account. They store their work in progress in that folder, which is backed up on a server. For office work and data sharing, Laura syncs and works on the content with Day Work Template (T1) created for work content.

Figure 6:
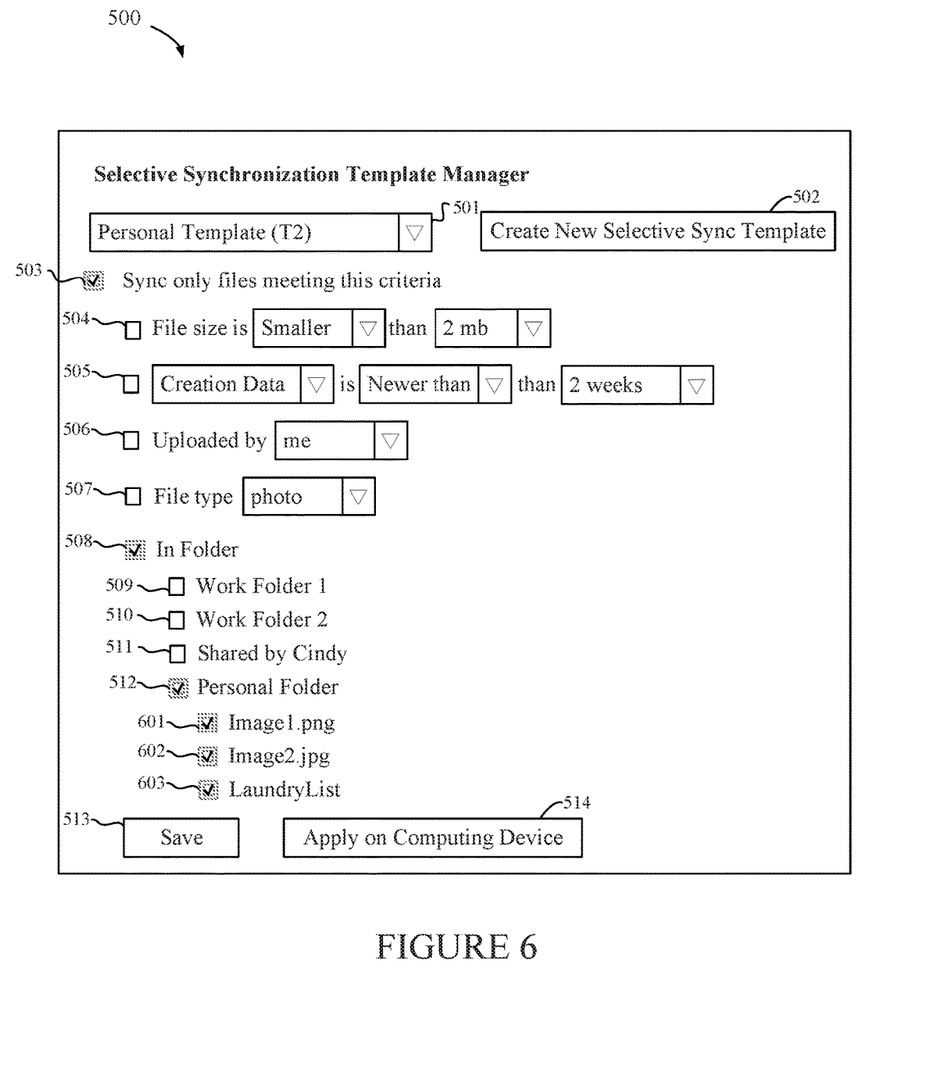
FIG. 6 is a block diagram illustrating the exemplary user interface of FIG. 5, which is used to create, edit, and apply another selective sync template on a computing device.

FIG. 6 is a block diagram illustrating the exemplary user interface 500 of FIG. 5 used to create, edit, and apply another selective sync template on a computing device. Continuing the above example, for her personal use, Laura uses the user interface 500 to create a template title "Personal Template (T2)," which has different criteria that the Day Work Template (T1). In this example, the criteria specify that only files within the personal folder (option 512) will be included in the subset of content files associated with this template. Note that the user interface 500 provides options 601, 602, 603 to allow the user to select the individual content files within the personal folder 512 for inclusion or exclusion from the subset. The options illustrated in FIGS. 5 and 6 are provides to illustrate a few of the many criteria that can be used to identify content files for inclusion in or exclusion from a subset.

A user can modify existing selective sync templates and/or create new ones to suit the user's requirements. In the example above, Laura may take on a separate assignment outside of her day work to design an adventure trip web site and web pages for it for mobile devices. For this assignment she uses Adobe® Comp CC software to initiate the design of the layout of the site on a tablet. She saves this component and uses a photo editing tool to do further edits and exploration. For this work, she has created a separate template, T3, that identifies a subset of content files related to this assignment.

The above use-case illustrates how Laura has created 3 varying selective sync templates that are available to her across all her devices. She is able to use specific templates based on her need across her devices. Laura has simplified and separated her working set using these selective sync templates as per each of her work environments. In addition, she has the flexibility to change (permanently or temporarily) the template that is used on any of her devices. For example, while Laura generally uses template T1 on her work computing device, she sometimes switches to template T2 to switch syncing of personal content on that device.

Exemplary Computing Device

Figure 7:
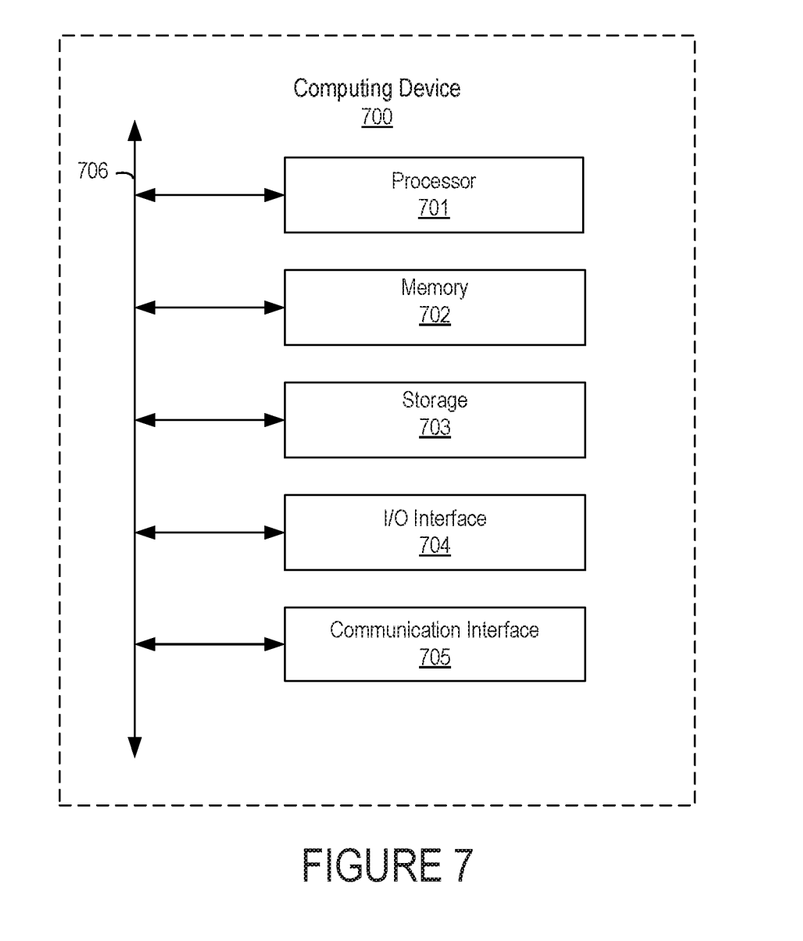
FIG. 7 is a block diagram depicting an example hardware implementation.

Any suitable computing system or group of computing systems can be used to implement the techniques and methods disclosed herein. For example, FIG. 7 is a block diagram depicting examples of implementations of such components. The computing device 70 can include a processor 71 that is communicatively coupled to a memory 72 and that executes computer-executable program code and/or accesses information stored in memory 72 or storage 73. The processor 71 may comprise a microprocessor, an application-specific integrated circuit ("ASIC"), a state machine, or other processing device. The processor 71 can include one processing device or more than one processing device. Such a processor can include or may be in communication with a computer-readable medium storing instructions that, when executed by the processor 71, cause the processor to perform the operations described herein.

The memory 72 and storage 73 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 70 may also comprise a number of external or internal devices such as input or output devices. For example, the computing device is shown with an input/output ("I/O") interface 74 that can receive input from input devices or provide output to output devices. A communication interface 75 may also be included in the computing device 70 and can include any device or group of devices suitable for establishing a wired or wireless data connection to one or more data networks. Non-limiting examples of the communication interface 75 include an Ethernet network adapter, a modem, and/or the like. The computing device 70 can transmit messages as electronic or optical signals via the communication interface 75. A bus 76 can also be included to communicatively couple one or more components of the computing device 70.

The computing device 70 can execute program code that configures the processor 71 to perform one or more of the operations described above. The program code can include one or more modules. The program code may be resident in the memory 72, storage 73, or any suitable computer-readable medium and may be executed by the processor 71 or any other suitable processor. In some embodiments, modules can be resident in the memory 72. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In a computing environment in which content files associated with a user account are stored on a server, a method for selectively synchronizing the content files between the server and a computing device, the method comprising:

receiving a selective sync template at the computing device, the selective sync template comprising user-specified criteria for identifying a subset of the content files to synchronize, wherein the selective sync template is associated with the user account and provided by the server to the computing device based on the computing device being authorized to access the user account;

receiving input to use the selective sync template for synchronization between the server and the computing device;

identifying the subset of the content files to synchronize between the server and the computing device, the subset of the content files identified by identifying which of the content files have characteristics specified by the user-specified criteria of the selective sync template;

storing a copy of the subset of the content files on the computing device;

detecting a change to the subset of the content files on the server or the copy of the subset of the content files on the computing device;

synchronizing the subset of the content files on the server with the copy of the subset of the content files on the computing device based on the change;

receiving a change to the user-specified criteria of the selective sync template; and based on the change, synchronizing the selective sync template on the server and on multiple computing devices authorized to access the user account.

2. The method of claim 1, wherein identifying the subset of content files comprises identifying the user-specified criteria of the selective sync template in one or more key/value pairs in a text-based file.

3. The method of claim 2, wherein identifying the subset of content files comprises identifying the user-specified criteria of the selective sync template in one or more tags in a text-based file.

4. The method of claim 1, wherein the selective sync template is received from the server by a second computing device that is authorized to access the user account, wherein the selective sync template is used on the second computing device to identify the subset of the content files for synchronization between the server and the second computing device.

5. The method of claim 1, wherein identifying which of the content files have the characteristics specified by the user-specified criteria of the selective sync template comprises identifying which of the content files have at least one of a containing folder, file size, file creation date, or file type that satisfies the user-specified criteria of the selective sync template.

6. The method of claim 1 further comprising receiving, at the computing device, multiple selective sync templates associated with the user account, wherein the input to use the selective sync template selects the selective sync template from the multiple selective sync templates.

7. The method of claim 1 further comprising:
receiving input to use a second selective sync template between the server and the computing device;
identifying a second subset of the content files to synchronize between the server and the computing device based on the second selective sync template; and
synchronizing the second subset of the content files between the server and the computing device.

8. The method of claim 1 further comprising receiving input on the computing device specifying the user-specified criteria for the selective sync template.

9. The method of claim 1 further comprising storing the selective sync template on the computing device and synchronizing the selective sync template between the server and the computing device when the selective sync template is changed on the server or the computing device.

10. The method of claim 1, wherein, of the content files, only the subset of the content files is stored on the computing device.

11. A system for providing selective sync templates for synchronizing content files between a server and a computing device, the system comprising:
a means for creating a selective sync template for a user account, the selective sync template created with user-specified criteria for identifying a subset of the content files to synchronize, wherein the selective sync template is associated with the user account and provided by the server to the computing device based on the computing device being authorized to access the user account;
a means for identifying the subset of the content files to synchronize between the server and the computing device;
a means for storing the selective sync template on the server for access by computing devices authorized to access the user account;
a means for detecting a change to the subset of the content files on the server or the copy of the subset of the content files on the computing device;
a means for synchronizing the selective sync template on the server with a copy of the selective sync template on the computing device authorized to access the user account;
a means for receiving a change to the user-specified criteria of the selective sync template; and
based on the change, a means for synchronizing the selective sync template on the server and on multiple computing devices authorized to access the user account.

12. The system of claim 11, wherein the means for storing the selective sync template stores the selective sync template as a text-based file having a key/value pair format.

13. The system of claim 11, wherein the means for storing the selective sync template stores the selective sync template as a text-based file having a tag-based format.

14. The system of claim 11, wherein the means for synchronizing detects changes to the selective sync template on the server.

15. The system of claim 11, wherein the means for creating the selective sync template provides a user interface for specifying the user-specified criteria.

16. The system of claim 11, wherein the means for creating the selective sync template automatically creates the selective sync template based on default criteria.

17. A non-transitory computer-readable medium storing instructions, the instructions comprising instructions for:
receiving a selective sync template at a computing device, the selective sync template comprising user-specified criteria for identifying a subset of content files stored on a server to synchronize, wherein the selective sync template is associated with a user account and provided by the server to the computing device based on the computing device being authorized to access the user account;
receiving input to use the selective sync template for synchronization between the server and the computing device;
identifying the subset of the content files to synchronize between the server and the computing device based on the selective sync template, the subset of the content files identified by identifying which of the content files have characteristics specified by the user-specified criteria of the selective sync template;
storing a copy of the subset of the content files on the computing device;
detecting a change to the subset of the content files on the server or the copy of the subset of the content files on the computing device;
synchronizing the subset of the content files on the server with the copy of the subset of the content files on the computing device based on the change;
receiving a change to the user-specified criteria of the selective sync template; and
based on the change, synchronizing the selective sync template on the server and on multiple computing devices authorized to access the user account.

18. The non-transitory computer-readable medium of claim 17, wherein identifying the subset of content files comprises identifying user-specified criteria of the selective sync template in a text-based file.

19. The non-transitory computer-readable medium of claim 18, wherein the text-based file is accessible for download from the server by the multiple computing device.

* * * * *